United States Patent [19]

Cheiky

[11] Patent Number: 4,916,036
[45] Date of Patent: Apr. 10, 1990

[54] CONTINUOUS CONSUMABLE ANODE

[75] Inventor: Michael C. Cheiky, Santa Barbara, Calif.

[73] Assignee: Dreisbach Electromotive, Inc., Santa Barbara, Calif.

[21] Appl. No.: 260,477

[22] Filed: Oct. 20, 1988

[51] Int. Cl.[4] .............................................. H01M 6/00
[52] U.S. Cl. .................................... 429/127; 429/233; 429/242
[58] Field of Search ................. 429/127, 233, 234, 242

[56] References Cited

U.S. PATENT DOCUMENTS

| | | | |
|---|---|---|---|
| 3,023,259 | 2/1962 | Coler et al. | 429/127 |
| 3,310,437 | 3/1967 | Davee et al. | 429/242 X |
| 3,577,281 | 5/1971 | Pountney et al. | 429/127 X |
| 3,663,721 | 5/1972 | Blondel et al. | 429/131 |

*Primary Examiner*—Stephen J. Kalafut
*Attorney, Agent, or Firm*—Marvin E. Jacobs

[57] ABSTRACT

A consumable anode of a reactive metal such as lithium is provided as a layer on a flexible, conductive substrate. The anode is preferably in the form of an elongated tape wound on a reel. The anode tape is fed from the reel into and through an elongated electrolyte reaction chamber formed between the surface of the anode tape and an opposed cathode. The ends of the compartment contain seals for retaining electrolyte between the electrodes. The tape is rewound on a driven take up reel.

16 Claims, 2 Drawing Sheets

CONTINUOUS CONSUMABLE ANODE

TECHNICAL FIELD

The present invention relates to primary electrical storage batteries and, more particularly, the invention relates to a continuous, consumable, metal film anode for such batteries.

BACKGROUND OF THE INVENTION

Domestic petroleum resources continue to deplete requiring increasing reliance by the United States on foreign sources. Many users of petroleum such as the electric power sector can change to other fuels such as nuclear, coal or biomass. The transportation sector uses about 25 percent of all energy consumed in the U.S. and about three-quarters of the energy consumed in transportation is used by highway vehicles. Fuels used in highway vehicles are almost entirely derived from petroleum. The family passenger automobile is the principal and dominate energy user within the highway vehicle system.

Petroleum fuels are readily refined and converted to automobile use. They are readily transported and stored as liquids or gases. The distribution and sales infrastructure for gasoline, diesel and butane or propane fuels are in place. These fuels are convenient to purchase and enough fuel can be stored on board a family vehicle to provide 200-500 miles of driving between refilling the fuel tank.

One alternative to petroleum is electric propulsion. Electric propulsion can be based on multiple fuel sources. Since batteries can be recharged from any electric outlet, the electric fuel can be generated by means of nuclear, coal, biomass, solar, etc. A battery for a first or only electric family vehicle requires high energy density and a rapid and easily accomplished economical refueling. Present batteries are not capable of providing the desired driving range and refueling is usually accomplished by a slow recharge of the battery.

| List of Prior References | |
|---|---|
| Patent No. | Patentee |
| 267,319 | Berstein |
| 273,739 | Jablochkoff |
| 2,605,297 | Dean |
| 2,921,110 | Crowley et al |
| 2,925,358 | DeMaio et al |
| 3,043,898 | Miller et al |
| 3,357,864 | Huber |
| 3,359,136 | Merten et al |
| 3,791,871 | Rowley |
| 4,000,351 | Hug |
| 4,001,043 | Momyer |
| 4,057,675 | Halberstadt |
| 4,184,012 | Barrella |
| 4,324,847 | Athearn |
| 4,414,293 | Joy et al |
| 4,416,957 | Goebel et al |
| 4,418,129 | Goebel |
| 4,434,213 | Niles et al |
| 4,502,903 | Bruder |

LITERATURE REFERENCE

The Lithium-Water-Air Battery: A New Concept for Automotive Propulsion UCRL-51811, May 1, 1975-NTIS

STATEMENT OF THE PRIOR ART

The aluminum air battery can provide the range but is uneconomical and so physically voluminous that it is impractical for a vehicle. On the other hand, the lead-acid design is economical but suffers from a low energy density. Fast recharges are impractical due to the high electrical power levels that would be required. Other batteries are also acceptable since they suffer from poor economics or an economical and/or inconvenient or lengthly recharge procedure.

The lithium-water or lithium-water-air battery offers good performance and good range between recharges. This battery as disclosed by Halberstadt et al in U.S. Pat. No. 4,057,675 was developed for marine applications. This lithium-air battery is a primary battery and cannot be recharged by application of electrical energy to the electrodes. Halberstadt proposes recharging this battery by replacing the consumable electrodes and recovering the dissolved lithium from the electrolyte.

The Halberstadt battery is a stack design. The stack must be disassembled and a fresh lithium anode element inserted into the stack and the stack reassembled and placed and sealed in the battery compartment. Lithium is very reactive and is readily passivated forming a high resistance film reducing energy efficiency. It is a difficult material to handle and store. The stack design also requires the handling of corrosive and harmful chemicals by personnel. Another problem with the stack design is that it is a contact design. In order to increase range, the anode thickness must be increased. As the anode is consumed, contact may be breached unless the stack is placed under compression which adds complexity and weight to the design. The stack design is impractical for a battery containing a consumable anode since contact between cell elements is lost as the anode is consumed. Merten and Miller et al maintain constant electrode spacing by use of springs, gas or hydraulic pressure or levers to maintain electrode spacing.

Another constraint in the use of lithium in a battery is the highly reactive nature of lithium. It is difficult to control energy output and it is difficult to stop the reaction quickly after power demand ceases. During storage of the lithium anode between power demands, lithium can react with oxygen or water or impurities to form a passivating coating by reaction with other materials present in the anode compartment or in the electrolyte. This coating contributes substantial internal resistance to the battery.

Electrical power output has usually been controlled or moderated by control of the supply of oxidant such as air, water or peroxide to the consumable anode or control the concentration of the electrolyte by addition or removal of electrolytic salt from the electrolyte. Addition of carbon dioxide results in precipitation of lithium carbonate. There is no way to abruptly stop the electrolytic reaction in present batteries. After the supply of oxidant ceases, the reaction and consumption of lithium continues until the lithium is consumed or until all exposed surfaces have been passivated.

The lithium anode usually takes the form of a thick layer of lithium bonded to a conducting substrate formed of a metal that is inert to the electrolyte such as the anode backplate used by Halberstadt or Merten et al. Laminar film electrodes have been utilized in disposable, secondary, lithium batteries.

Hug discloses a spirally wound electrode for rechargeable alkaline cells using thin film electrodes separated by a film of plastic separator material. Barrela discloses a spirally wound anode-separator-cathode assembly for a secondary lithium battery containing a band restricted from reaction to provide electrical continuity. Athern and Joy provide an edge band with non-reactive metallized surface to periphally frame a lithium anode. Niles et al clad a lithium anode with an aluminum-magnesium cladding to improve performance. Bruder forms a laminate of lithium on a conductive plastic substrate which is then die cut to form individual anodes. None of these references utilize storage of lithium within the battery isolated from the electrolyte compartment nor do they disclose the feeding of lithium from storage to the electrolyte compartment at the instant of power demand.

STATEMENT OF THE INVENTION

A consumable anode for a mechanically refuelable battery of long duration and having high capacity is provided by the present invention. The battery is configured such that the consumable anode is isolated in a protective chamber and is only placed in electrolyte contact with a cathode at the instant of power demand from the battery. The anode is provided in a separate compartment which is readily removable from the remainder of the battery. The battery is readily and conveniently refueled in this manner. This battery can be used to fuel an electric vehicle competitive in performance with an internal combustion engine yet be free of pollution. Such a power system would also provide independence from the importation of foreign petroleum.

The continous anode of the invention is provided as a long strip of a consumable metal applied to a conductive substrate. The strip is stored in a container having an exit slot. The container is latched to the main battery compartment. The forward end of the strip is connected to an anode advance means which pulls the strip past the cathode. The forward end of the strip preferably contains a fold splice which slidingly engages a fold splice on the anode advance drive in the battery compartment allowing fuel cartridges to be exchanged without disassembly of the battery.

The anode strip can be folded or wound to conserve space. A preferred configuration is to wind the strip as a coil on a spool as disclosed in copending application entitled "Replaceable Cartridge" filed concurrently herewith, the disclosure of which is expressly incorporated herein by reference.

In order to control the energy output, the anode film can be alloyed with less reactive or non-reactive metals or portions of the film may be absent. The anode can be applied to the substrate in a pattern by means of photoresist techniques or portions of the alloy film can be removed by etching. The removal of some of the consumable anode material can also be used to improve battery performance by reduction of hydrogen overpotential. Energy density and capacity of a cell can also be controlled by adjusting the width of the strip, the thickness of the consumable metal and the length of the reaction zone. Multiple reels of the tape strip can be electrically connected and can share a common feed spool and take up spool provided that the cells and spools are electrically isolated from each other. Removal of alloy film would also lighten the alloy assembly. Weight can also be lessened by removing metal from the substrate by perforation or slotting such as by use of a metal mesh substrate or by use of a conductive resin substrate.

The surface of the film of metal fuel is preferably covered with a thin film of oil. This film isolates and protects the film from oxidizing and becoming passivated. It also helps to seal the anode strip as it passes out the exit slot into the battery.

The anode tape is a malleable, flexible composite of the film of consumable anode metal deposited on the inert surface of the substrate. The composite tape is flexible enough so that it does not crack or separate when bent onto a spool or fed past guide rolls through the battery. The anode film is usually thicker than the substrate and its radius of curvature is much larger than that of the substrate when bent. The anode film must be malleable and flexible to avoid separating or cracking when bent.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
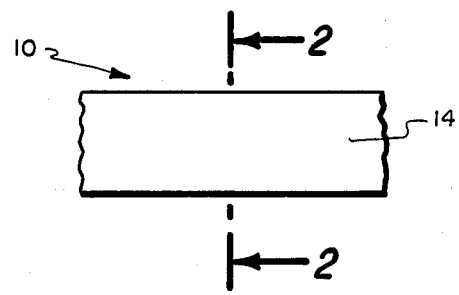
FIG. 1 is a top view in elevation of a flexible strip of composite anode in accordance with the invention.
Figure 2:
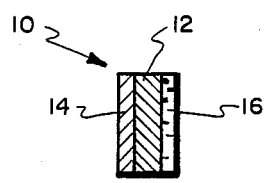
FIG. 2 is a view in section taken along line 2—2 of FIG. 1.

Referring now to FIGS. 1 and 2, the continuous, consumable anode 10 of the invention generally comprises a flexible layer 12 of consumable metal attached to a substrate 14 inert to the electrochemical environment of the cell. The anode can be selected from any anodic metal used in batteries selected from Group I-VII of the Periodic Table such as lithium, iron, aluminum, lead, etc. Anode layers 12 that are highly reactive with oxidizing gases and can form passivating layers can be protected by covering the layer 12 with a viscous film 16 such as a liquid oil impervious to the oxidizing gas as an oil. The continuous anode 10 of the invention is provided in a compact form suitable for storage and feeding into the active portion of a battery cell. The anode 10 can be folded or wound into a reel.

Figure 3:
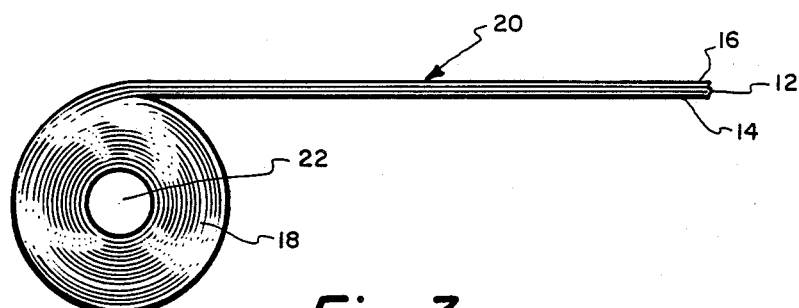
FIG. 3 is a side view in elevation of a spiral anode tape mounted on a hub.

As shown in FIG. 3, the preferred anode configuration is a spiral 18 of flexible anode tape 20 wound on a hub 22. The hub can be formed of conductive material and can be used as the anode terminal or the hub can be formed of a nonconductor such as plastic and the connection to the anode can be provided by direct connection to the continuous anode, preferably by connection to the conductive substrate 14.

Figure 4:
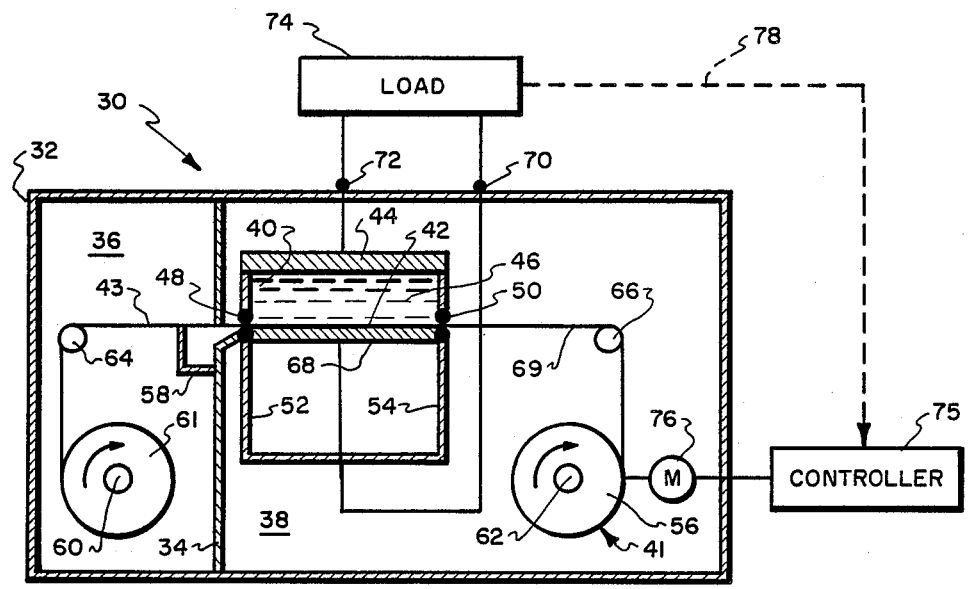
FIG. 4 is a schematic view of a battery cell containing a spiral anode tape.

Referring now to FIG. 4, a schematic cell utilizing the continuous, consumable anode is illustrated. The cell 30 includes a casing 32 including a wall 34 dividing the casing into an anode storage compartment 36 and a second compartment 38 housing an electrolytic reaction chamber 40 and the anode take up assembly 41. An elongated narrow reaction chamber 40 is formed between a length 42 of the anode tape 43 and an opposed cathode. A layer 46 of electrolyte is retained in the space between the anode tape 42 and the cathode 44 by means of two sets of seals 48, 50, respectively, placed in the walls 52, 54 at each side of the reaction chamber 40. The forward set of seals 48, 50 also act to wipe the surface of the tape 43 to remove the film of oil which falls into a tray 58. The electrolyte can be retained in a porous polymeric or fiberglas separator. The electrolyte can be stationary or circulated though the reaction chamber 40. The hub 60 of the anode supply reel 61 is rotatably mounted in the anode compartment 36 and the hub 62 of the take up reel 56 is rotatably mounted in the second compartment 38. The anode tape 43 is sharply bent as it passes over guide roller 64 and guide roller 66. The bottom surface 69 of the conductive substrate of the tape 43 can be contacted by a sliding contact member 68 which connects to a terminal 70. The cathode 44 is connected to a second terminal 72. The terminals are connected to a load 74 during power demand. During power demand a controller 75 controls the speed of the motor 76 which drives the take-up reel 56 and advances anode tape 43 through the seal 48 into the reaction chamber 40. A signal can be sent through a line 78 from the load 74 to the controller 75 to control the rate of feed of the anode tape 43. The anode feed rate can be continuous or incremental lengths of anode tape can be digitally advanced into the electrolytic reaction chamber 40. The anode tape 20 on reel or hub 22 is fed into a chamber.

Figure 5:
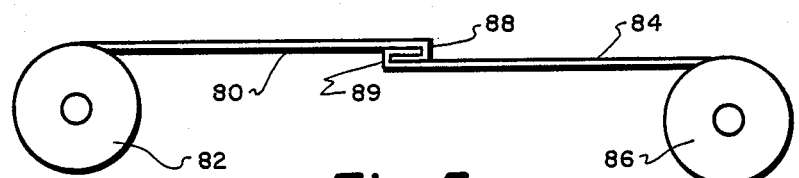
FIG. 5 is a schematic view of an anode tape splice.

The anode tape can be provided with a connector for reliable connection attachment to take up reel. The connector can be formed of hooks, threaded members, metal Velcro material or the like. As shown in FIG. 5, the leading section 80 of the anode tape 82 can be provided with a portion of a connector adapted to engage a reciprocal portion provided on a short leader 84 attached to the takeup reel 86. As shown, the connectors can take the form of a downwardly facing reverse turned edge 88 formed on one of the leaders and an upwardly facing reverse-turned edge 89 formed on the other leader. The two reversed edges can be engaged by sliding and will remain engaged by tension from the driven take-up ree. The leaders need not contain a layer of consumable metal.

The electrolyte can be stationary or can flow through the compartment. Stationary electrolyte can be adsorbed into a porous separator material such as polyethylene, polytetrafluoroethylene or porous glass or fiberglass. The cathode can be a metal, composite or a cathode activated by a flow of oxygen gas such as a porous carbon element containing a layer of catalyst such as platinum and having a screen or mesh element facing on or both sides of the electrode or being embedded therein. An air cathode would usually be mounted on an external wall of the casing.

Figure 6:
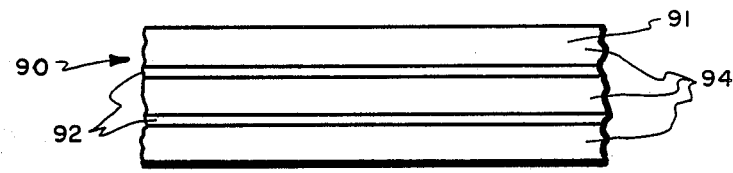
FIG. 6 is a bottom view of a reduced weight anode tape showing metal contact strips.
Figure 7:
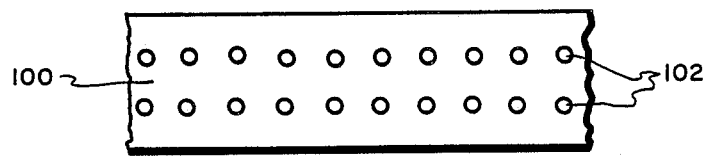
FIG. 7 is a bottom view of another substrate.

The substrate need only be conductive in the portions contacted by the wiping element. As shown in FIG. 6, the substrate 91 anode tape 90 need only contain ribbons 92 of substrate metal in the bands corresponding to the location of the bottom wiping contacts. The remaining portions 94 of the substrate could be filled with a non-conductor such as a synthetic resin. The anode metal need not be in constant contact with the substrate metal. As shown in FIG. 7, the resin substrate layer 100 can be provided with a series of metal studs 102 in the bands corresponding to the location of the rear contacts. The use of resin with metal studs also reduces the weight of the anode.

Figure 8:
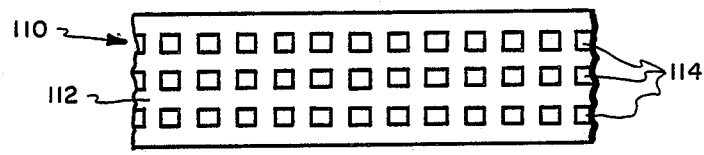
FIG. 8 is a bottom view of a further substrate.
Figure 9:
FIG. 9 is a top view of a reduced weight anode film.

Another way to reduce the weight of the anode tape is to utilize perforated metal. The anode tape 110 shown in FIG. 8 uses a substrate 112 formed of expanded metal having diamond-shaped perforations 114. Weight can also be reduced and the anode reaction moderated by removing some of the anode film. As shown in FIG. 9, portions of the consumable metal anode film 120 can be removed by providing a pattern of non-consumable metal or resin elements 122 in the film 120. A convenient way to form the elements 122 is by photolithographic techniques in which a layer of actinically sensitive resin is deposited, exposed to light though a mash and the non-aired areas of the film are then removed by solvent.

The preferred consumable anode material for purposes of lightness and weight and energy density is lithium. The anode layer contains at least 50 percent by weight of lithium in a thickness from 0.1 to 0.5 inches usually from 1 mil to 200 mils, generally about 10 to 100 mils. The reactivity of lithium can be moderated by alloying the lithium with a metal having a low hydrogen overpotential such as a Group I, II, III or IV metal such as sodium, potassium, rubidium, cesium, calcium, beryllium, magnesium, strontium, barium, copper, silver, gold, zinc, cadmium, mercury, tin, lead, antimony or bismuth. The alloying elements are selected to avoid embrittling the flexible lithium layer. It has been found that lithium is very malleable and fairly thick layers of lithium can be bent without cracking or separating from the substrate.

The substrate can be a conductive metal which is inert in the electrochemical environment of the cell. Suitable materials are metals having low hydrogen overpotential which readily bond to lithium such as zirconium, tin or titanium. Composite anode tapes are readily manufactured by pressure bonding a clean surface of lithium to a clean surface of titanium in an inert atmosphere. The two metal layers bond at room temperature without the need to melt, solder or weld the materials and form a stable laminate that does not separate after several years of storage.

Figure 10:
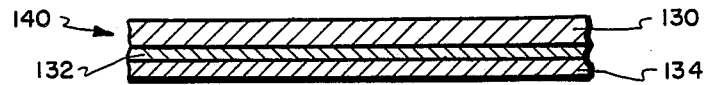
FIG. 10 is a view section view of a three layer lithium anode tape.

The thickness of the substrate is kept as small as possible to reduce weight and to maintain flexibility of the anode tape as it is bent and passes over turning rollers as it passes through the battery compartment. Usually the substrate film has a thickness from 0.5 to 50 mils generally from 5 to 20 mils. Titanium and zirconium are expensive metals. The amount of low hydrogen overpotential substrate metal can be substantially reduced by coating the substrate metal onto a conductive, flexible, structural support material such as stainless steel or a conductive resin. As shown in FIG. 10, an anode tape 140 can be formed having a thick, flexible and malleable layer of lithium 130 bonded to a layer 132 of titanium coated onto a stainless steel support 134. The layer 132 need only be thick enough to avoid pinholes such as a film having a 20 to 100 micron thickness, generally about 40 to 60 microns. The continuous lithium electrode of the invention can be utilized with aqueous or non-aqueous electrolytes in liquid or gelled form or absorbed into porous carriers. The electrolyte can contain a neutral salt such as lithium perchlorate (LiClO$_4$) in a solvent or a base such as aqueous 9M KOH. Suitable solvents are aprotic solvents such as dimethyloxyethane (DME) and propylene carbonate.

It is to be realized that only preferred embodiments of the invention have been described and that numerous substitutions, modifications and alterations are permissible without departing from the spirit and scope of the invention as defined in the following claims.

What is claimed:

1. A continuous electrode for an electrochemical cell comprising:
   a length of flexible tape wound into a cylindrical coil and mounted on a rotatable hub, said tape having a leading edge containing a releasable connector member adapted to engage a second connector member on a second tape, said flexible tape being formed of a first layer of metal consumable by an electrochemical cell and the first layer being bonded to an inert, conductive substrate.

2. An electrode according to claim 1 in which the releasable connector includes a reverse bent forward edge forming a first hook adapted to slidingly engage a complementary shaped second hook on another tape.

3. A continuous electrode for an electrochemical cell comprising:
   a length of flexible tape formed of a first layer of metal consumable by an electrochemical and being reactive with a gas, said first layer being bonded to an inert, conductive substrate; and
   a layer of protective liquid applied to the surface of the first layer that is impermeable to said gas.

4. An electrode according to claim 1 in which the substrate is discontinuous.

5. A substrate according to claim 4 in which the substrate if formed of perforated metal.

6. A continuous electrode for an electrochemical cell comprising:
   a length of flexible tape formed of a first layer of metal consumable by an electrochemical cell, said first layer being bonded to an inert conductive substrate which is formed of a film of non-conductor containing a pattern of conductive studs extending from the rear surface of the first layer to the outside surface of the substrate.

7. A continuous electrode for an electrochemical cell comprising:
   a length of flexible tape formed of a first layer of metal consumable by an electrochemical cell, said first layer being bonded to a substrate which is formed of a layer of non-conductor containing at least one discrete axial band of conductor.

8. An electrode according to claim 7 in which the non-conductor is a synthetic resin.

9. A continuous electrode for an electrochemical cell comprising:
   a length of flexible tape formed of a first layer of metal consumable by an electrochemical cell which comprises at least 50 percent by weight of lithium, said first layer being bonded to an inert conductive substrate including a film of metal having low hydrogen overpotential attached to the bottom surface of the first layer.

10. An electrode according to claim 9 in which the film comprises titanium, zirconium or tin.

11. An electrode according to claim 9 further including a layer of structural metal attached to the film.

12. An electrode according to claim 11 in which the film comprises titanium and the structural metal is stainless steel.

13. A battery comprising in combination:
    a casing enclosing an anode compartment and a second compartment, an elongated battery chamber and a spent anode take-up assembly.
    said anode compartment including journal means for rotating a reel containing a roll of flexible anode tape;
    said battery chamber having an inlet for receiving the anode tape and an outlet for feeding the spent anode tape to the take-up assembly disposed in the second compartment.
    a cathode disposed opposite the anode and forming one side of the battery chamber; and
    a layer of electrolyte received in the battery chamber between the anode tape and the cathode.

14. A battery according to claim 13 in which the anode tape includes a layer containing lithium mounted on a conductive substrate.

15. A battery according to claim 14 in which the cathode is a gas-permeable cathode.

16. A battery according to claim 13 in which the inlet and the outlet include seals for retaining the electrolyte in the chamber.

* * * * *